Feb. 28, 1939.　　　　G. H. BLETTNER　　　　2,148,423
METHOD OF MAKING COMPOSITE PISTONS
Filed March 23, 1936　　2 Sheets-Sheet 1
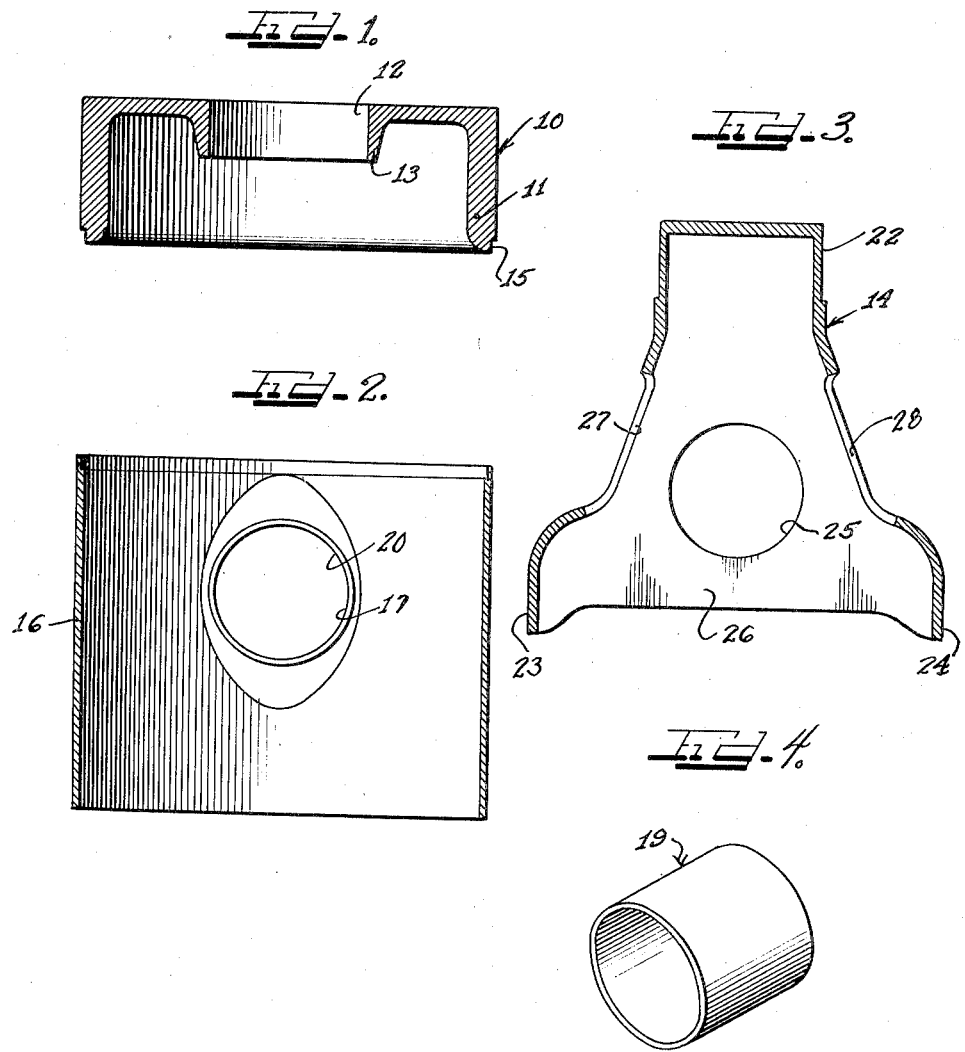
Inventor
GEORGE H. BLETTNER.
by Charles T. Hills Attys.

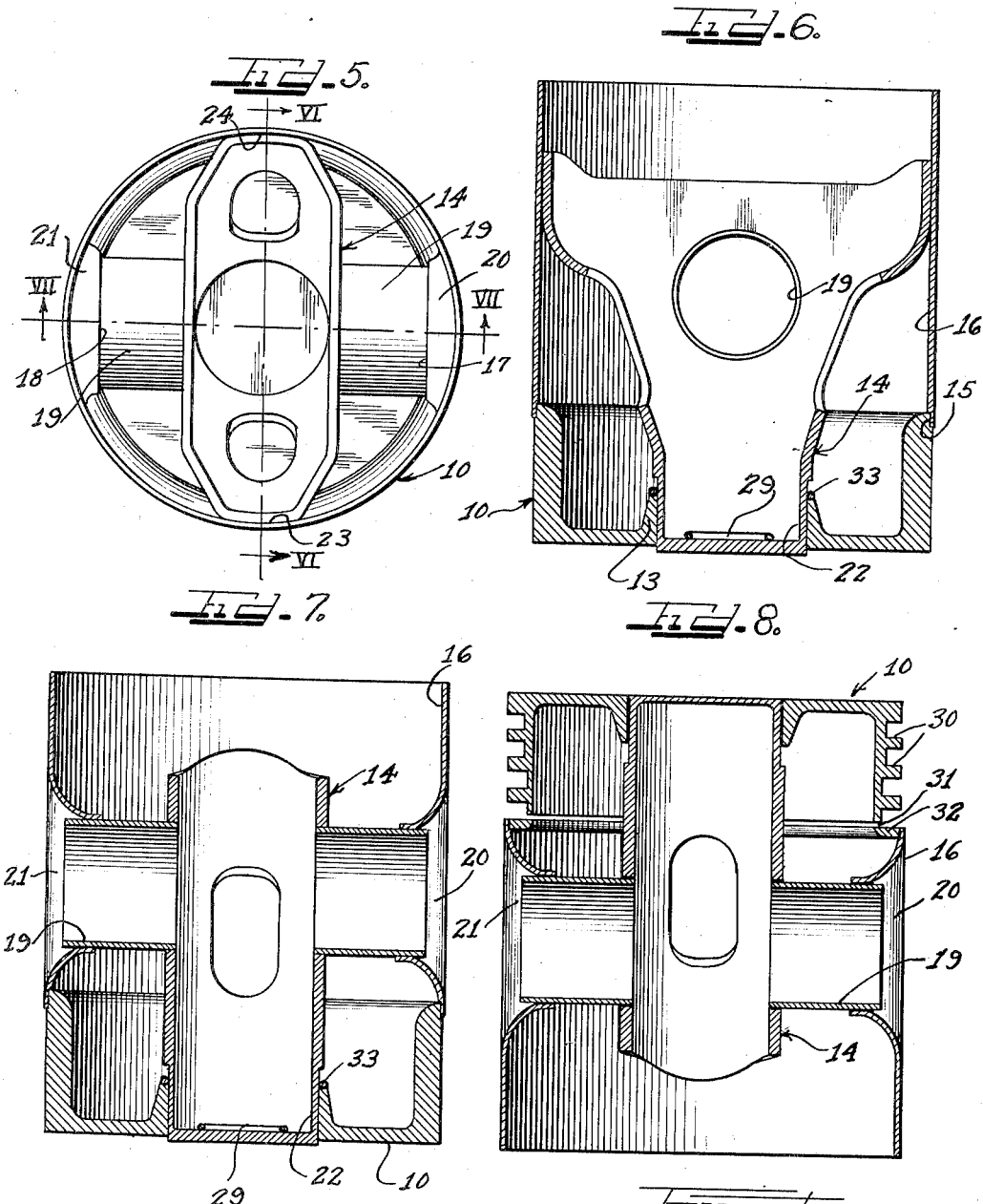

Patented Feb. 28, 1939

2,148,423

UNITED STATES PATENT OFFICE 2,148,423

METHOD OF MAKING COMPOSITE PISTONS

George H. Blettner, Chicago, Ill., assignor to Renette Company, Chicago, Ill., a corporation of Illinois Application March 23, 1936, Serial No. 70,334

3 Claims. (Cl. 29—156.5)

This invention relates to a composite metal article and to a method of making the same, and more particularly to the manufacture of a composite all steel piston.

My present invention contemplates separately forming the parts of a piston, such as the head, skirt, bridge or strut members, and wrist pin thimbles of steel, assembling these parts in their proper relative position and securing them together preferably by means of copper brazing under a reducing atmosphere, and then subjecting the composite piston so formed to a heat treatment to improve the characteristics of the steel.

It is therefore an object of this invention to provide a method for making a composite all steel piston and heat treating the same to improve the characteristics of the steel.

It is a further important object of this invention to provide a method for making a composite piston for internal combustion engines, wherein the parts are separately formed of steel and are so assembled and united as to be of light weight and yet have sufficient rigidity against mechanical and explosion forces.

It is a further important object of this invention to provide a method of constructing a piston that includes the assembly of the separate parts thereof in such manner that they will maintain their alignment and relative position during the step of brazing the parts together.

It is a further important object of this invention to provide a method of heat treating a composite all steel piston to improve the characteristics of the steel.

Other and further important objects of this invention will be apparent from the disclosures in the specification and the accompanying drawings.

This invention (in a preferred form) is illustrated in the drawings and hereinafter more fully described.

On the drawings:

Figure 1 is a transverse sectional view of a preformed head portion;

Figure 2 is a longitudinal sectional view of a preformed skirt portion;

Figure 3 is a longitudinal sectional view of a bridge or strut member for use in connecting the head portion of Fig. 1 and the skirt portion of Fig. 2;

Figure 4 is an isometric view of a bearing sleeve or thimble for receiving a wrist pin;

Figure 5 is a top plan view of the aforesaid parts in assembled relation;

Figure 6 is a longitudinal sectional view of the assembled parts taken substantially along the line VI—VI of Fig. 5;

Figure 7 is a longitudinal sectional view taken substantially along the line VII—VII of Fig. 5; and Figure 8 is a longitudinal sectional view of a finished composite steel piston in normal position, made in accordance with the method of my invention.

As shown on the drawings:

The reference numeral 10 indicates a head portion formed of low carbon steel and provided with an integral peripheral flange 11 of sufficient thickness to have piston ring receiving grooves formed therein. Said head 10 is provided with a central opening 12 inwardly flanged as at 13 to provide a cylindrical bore for receiving the end of a bridge or strut member indicated generally by the reference numeral 14. The flange 11 is provided at its lower edge with a centralizing pilot 15 to be pressed into a skirt portion 16 and hold the same in position.

Said head 10 may be formed of any suitable steel, such as S. A. E. #1010, which is suitable for use in a stamping, deep drawing or forging operation. Other steels, however, may be used in the formation of the head and the head may be cast, or it may be machined from bar stock of S. A. E. specification #1112 or #X1112.

The skirt 16 may be formed by a drawing operation from sheet steel, such as S. A. E. specification #1020, or other steel which will withstand wear and not be of sufficient hardness to cut or score the cylinder. Said skirt is cylindrical in shape and of such diameter as to be snugly received by the male pilot 15 of the head member 10. The skirt 16 is provided with aligned openings, which may be formed by piercing indentations at diametrically opposite points, as at 17 and 18, for receiving wrist pin thimbles 19. Said openings 17 and 18 are provided with inwardly turned flanges 20 and 21, repectively, which serve to engage with the wrist pin thimbles 19.

The bridge or strut member 14 may suitably be drawn from sheet steel of S. A. E. specification #1010 or #1020. Said bridge member is of hollow construction and generally conical in shape but flattened sidewise. The bridge member comprises a closed cylindrical end portion 22 of the proper diameter to fit snugly into the bore 12 and engage with the flange 13 of the head member 10. The other end of said bridge member 14 is flared outwardly to provide segmental cylindrical surfaces 23 and 24 of a diameter such that said segmental cylindrical portion will tightly engage the inner cylindrical surface of the skirt 16 when the bridge member is assembled in place. Said bridge member is also provided with oppositely positioned aligned openings 25 for receiving the wrist pin thimbles 19, said openings 25 being positioned in the flattened faces 26 of said bridge member. The intermediate walls of said bridge member 14 may be provided with openings 27 and 28 to give a lighter and more resilient construction.

The wrist pin thimbles 19 may suitably be formed of steel of S. A. E. specification #1010 from tubular material. Said wrist pin thimbles 19 are adapted to be inserted through the flanged openings 17 to be supported by the flanges 20 at one end and within the openings 25 of the bridge member at the other end.

The head, skirt, bridge member and wrist pin thimbles are assembled as shown in Figs. 5 to 7 inclusive with the head 10 in lowermost position. As so assembled, the parts are self-aligning owing to their construction and the snug fit of the joints so formed. The skirt 16 is placed onto the pilot of the head to be received in the peripheral groove 15 and the tubular closed end 22 of the bridge member 14 is inserted into the flanged opening 12 of the head to properly align the skirt and head portion. The thimbles 19 serve to align the openings 17 in the skirt and the openings 25 in the bridge member. All of the joints thus formed have a press fit.

Preparatory to securing the parts together, suitable brazing material, such as a copper wire 29 is positioned at the bottom of the closed end 22 or adjacent one or more of the joints between the parts, as at the joint 33 between the closed tubular end 22 of the bridge member and the flange 13 of the head. It will be understood that other forms of brazing material may be used, such as rings or sheets of copper or copper containing material, such as brass, or the joints may be coated with a copper bronze or copper powder, or may be copper plated.

The assembled parts with the brazing material in place are next placed in a furnace having a reducing atmosphere and the temperature raised uniformly to between 1700 and 2100° F., or to a sufficiently high temperature to cause the brazing material to melt and flow between the joints by capillary action. To facilitate this, the assembled composite piston is placed in the furnace, preferably in an inverted position such as shown in Fig. 6. In the reducing atmosphere of the furnace, the copper brazing material is drawn by capillary action between the parts forming the several joints to effect a brazing of said joints. The tighter the joints, the more readily will the brazing material be drawn into them and the better will be the union formed.

After the composite piston has been subjected to the proper temperature to complete the brazing operation, it is then cooled to a temperature below the critical range of the steels employed and the temperature adjusted to within the critical range for the steels used in the several parts of the piston, which, in general, will be between 1450 and 1600° F. The temperature is maintained within the critical range for a suitable length of time to enable all parts of the piston to come to the same temperature, and then the composite piston is quenched in oil or other suitable medium, such heat treatment being designed to restore the original properties of the steel or even improves such properties. In particular, the heat treatment restores the strength and elasticity of the steel. The heat treatment described is referred to in the claims as a "simple heat treatment" since it is carried out without changing the composition or analysis of the steel itself.

The heat treated composite piston is now ready to be mach ied to final form and the head provided with grooves 30 for receiving piston rings (not shown). If desired, the outer periphery of the skirt 16 may be entirely separated from the head 10 by severing the lower portion of the head, as at 31, to leave a portion 32 of the head as a reinforcing flange for the upper portion of the skirt 16. Other common means of finishing the piston may be employed.

It will be understood that although I have shown a specific form of construction of a composite piston, my present invention is not dependent upon any specific construction but has to do with the general methods of forming all steel composite pistons as above described. The construction of the piston itself, as well as various modifications thereof, will be claimed in a separate application.

It will also be understood that the method herein described is applicable to the manufacture of other composite steel articles of a low carbon steel, such as connecting rods and cylinder heads formed of steel stampings, where the parts are united by a copper brazing method. In all such cases the strength of the composite article can be restored by the heat treatment herein described.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of forming a composite piston from preformed low carbon steel parts including a head portion, sheet metal skirt and strut member and wrist pin thimbles, which method comprises assembling said parts in their proper relative positions, subjecting the resulting assembly at a temperature above the critical range of such steel solely and simply to a brazing operation to bond said parts together, thereafter directly subjecting said assembly to a simple heat treatment within said critical range, and quenching said assembly from said range.

2. The method of forming an all steel composite piston, which comprises separately forming a head, skirt and strut member of low carbon, comparatively low-strength steel, assembling said head and skirt in the proper relative position to each other with said strut in position to connect and brace the same, placing a copper-containing brazing material on the inside of the assembled members with the head member lowermost, subjecting the assembled members to a sufficiently high temperature above the critical temperature of said steel to melt said brazing material for the sole purpose of causing the same to flow into the joints formed between said members to braze the same together, cooling and subsequently subjecting the steel to a simple heat treatment by adjusting the temperature of the thus formed composite piston to within the critical range of said low carbon steel and quenching therefrom to improve the characteristics of said steel.

3. The method of making a composite piston structure of low carbon content, comparatively low-strength steel having a critical range of about 1450 to 1600 degrees Fahrenheit, which comprises separately preforming the parts of such steel and assembling them in proper relative positions, applying copper-containing brazing material, subjecting the structure solely and simply to a brazing operation at a temperature of from 1700 to 2100 degrees Fahrenheit for fusion and flow of the brazing material, then cooling the structure and subsequently subjecting said structure to a heat treatment consisting of adjusting the temperature of said structure to within the range of 1450 to 1600 degrees Fahrenheit and quenching from such range in a suitable quenching medium to thereby improve the physical characteristics of the steel and increase the strength of the assembled parts and structure.

GEORGE H. BLETTNER.